United States Patent [19]

Pisipati et al.

[11] Patent Number: 4,870,131

[45] Date of Patent: Sep. 26, 1989

[54] LOW GLOSS MOLDING COMPOSITION

[75] Inventors: Ramesh M. Pisipati, Longmeadow; Joseph O. Campbell, Indian Orchard, both of Mass.

[73] Assignee: Monsanto Company, St. Louis, Mo.

[21] Appl. No.: 158,505

[22] Filed: Feb. 22, 1988

[51] Int. Cl.$^4$ .................. C08L 37/00; C08L 51/04
[52] U.S. Cl. .................................... 525/74; 525/78; 525/86; 525/80; 525/84
[58] Field of Search ........................................ 525/74

[56] References Cited

U.S. PATENT DOCUMENTS

| | | | |
|---|---|---|---|
| 4,554,316 | 11/1985 | Sakano et al. | 525/71 |
| 4,596,851 | 6/1986 | Lindner et al. | 525/67 |
| 4,657,975 | 4/1987 | Kodama et al. | 525/71 |

FOREIGN PATENT DOCUMENTS 0196041 10/1986 European Pat. Off. .
5598541 6/1985 Japan .

*Primary Examiner*—John C. Bleutge
*Assistant Examiner*—Susan Berman
*Attorney, Agent, or Firm*—Michael J. Murphy; William J. Farrington

[57] ABSTRACT

A composition capable of providing low gloss in a part molded therefrom consisting essentially of 20 to 50% by weight of a graft copolymer of ethylenically unsaturated monomers grafted unto a rubber with a rubber content of 5 to 80% by weight based on the weight of Component A; 80 to 50% by weight of one or more thermoplastic, rubber-free copolymers containing: (i) 1 to 25% by weight based on the total weight of Component (B) of an unsaturated dicarboxylic acid anhydride monomer and (ii) 0.5 to 2% by weight based on the total weight of Component (B) of an ethylenically unsaturated copolymerized epoxide compound.

4 Claims, No Drawings

LOW GLOSS MOLDING COMPOSITION

BACKGROUND OF THE INVENTION

This invention relates to thermoplastic compositions and more particularly to such compositions which exhibit low gloss in parts molded therefrom.

In certain applications a glossy surface on a part molded from a thermoplastic composition is undesirable. For example, a shiny surface on an automotive interior part can undesirably reflect light toward the driver which could be avoided with a low gloss surface. By "low gloss" is meant a molded part surface exhibiting less than 30% specular reflectance as measured by the test more particularly described hereinafter. In the past, more conventional high gloss thermoplastic compositions, particularly those having a relatively high heat distortion temperature on the order of 100° C. or more, have been used in these applications and low gloss paint applied to achieve the desired low gloss. This is expensive and a need exists in the art for compositions capable of exhibiting low gloss in parts molded therefrom without significant deterioration in the remaining desirable balance of properties, including impact strength.

SUMMARY OF THE INVENTION

Now improvements have been made in molding compositions which alleviate shortcomings and help to satisfy needs in the prior art.

Accordingly, a principal object of this invention is to make a simple formulation change in rather conventional molding compositions to provide low gloss without a significant deterioration in other desirable properties of such compositions.

A specific object is to provide a low gloss additive for conventional rubber modified acrylonitrilestyrene graft copolymer and styrene-maleic anhydride copolymer compositions.

Other objects of this invention will impart the obvious and will in part appear hereinafter.

These and other objects are accomplished by recognizing that a minor amount of a compound previously used as a compatibilizing agent can instead be used as a low gloss additive in inherently compatible compositions containing copolymers of ethylenically unsaturated monomers grafted unto a rubber substrate.

More specifically, there is provided a composition consisting essentially of:
- (A) 20–50% by weight of a graft copolymer of ethylenically unsaturated monomers grafted onto a rubber with a rubber content of 5 to 80% by weight based on the weight of component (A);
- (B) 80–50% by weight of one or more thermoplastic, rubber-free polymers containing:
  - (i) 1 to 25% by weight based on the total weight of Component (B) of a polymerized unsaturated dicarboxylic acid anhydride monomer; and
  - (ii) 0.5 to 2.0% by weight based on the total weight of Component (B) of a polymerized ethylenically unsaturated copolymerized epoxide compound, wherein the total of (A) and (B) must be 100% by weight.

Component B (ii) can be 1 to 5% by weight of a terpolymer comprising polymerized monomers of styrene, acrylonitrile and glycidyl methacrylate wherein the relative amounts by weight of the monomers in the terpolymer are 68 to 80% of styrene, 19.5 to 30% of acrylonitrile and 0.5 to 2% of glycidyl methacrylate.

DETAILED DESCRIPTION OF THE INVENTION

Graft copolymers usable as Component (A) in compositions of the invention are known graft polymers of ethylenically unsaturated monomers grafted onto rubbers selected from the group consisting of diene monomer rubbers, alkyl acrylate rubbers and EPDM rubbers. Preferred graft copolymers (A) are those in which a monomer mixture of 95 to 50% by weight of styrene, α-methylstyrene, methyl methacrylate or mixtures thereof and 5 to 50% by weight of acrylonitrile, methyl methacrylate or mixtures thereof is grafted onto one of the previously mentioned rubbers.

Suitable rubbers include conjugated diene rubbers including polybutadiene, butadiene/styrene copolymers with up to 30% by weight of styrene, butadiene/acrylonitrile copolymers with up to 20% by weight of acrylonitrile, or copolymers of butadiene with up to 20% by weight of a lower alkyl ester of acrylic or methacrylic acid, for example methyl acrylate, ethyl acrylate, or ethyl methacrylate. Examples of other suitable rubbers are polyisoprene or polychloroprene. Alkyl acrylate rubbers based on $C_1$–$C_8$-alkyl esters of acrylic acid, for example ethyl, butyl and/or ethylhexyl acrylate, are also suitable. Such alkyl acrylate rubbers can optionally contain up to 30% by weight of copolymerized monomers such as vinyl acetate, acrylonitrile, styrene, methyl methacrylate or vinyl ether. Such alkyl acrylate rubbers can also contain smaller quantities, for example up to 5% by weight, of ethylenically unsaturated monomers having a crosslinking function. Examples of such crosslinking agents are alkylenediol di(meth)acrylates, polyester di(meth)acrylates, divinylbenzene and trivinylbenzene, triallyl cyanurate and allyl (meth)acrylate. Alkyl acrylate rubbers of these types are known in the literature. Acrylate rubbers suitable as a grafting base for the preparation of graft polymer component (A) can also be products which contain, as the core, a crosslinked diene rubber of one or more conjugated dienes such as polybutadiene, or of a copolymer of a conjugated diene with an ethylenically unsaturated monomer such as styrene and/or acrylonitrile. Examples of other suitable rubbers are EPDM rubbers, i.e. rubbers of ethylene, propylene and an unconjugated diene monomer. Particularly preferred rubbers are diene monomer rubbers or alkyl acrylate rubbers.

Rubbers suitable for use in the invention for preparation of the graft polymers of component (A) have a weight average particle size diameter of 0.08 microns to 5 microns, especially 0.1 to 1 micron.

A preferred form of Component (A) comprises a blend of graft copolymers providing a composition having a bimodal particle size distribution—i.e. the particles of the blend have an overall weight average particle diameter between 0.1 to 1 micron but are made up of two phases, each of which has a size different from the other. Compositions of this type in the form of styrene-acrylonitrile copolymers grafted onto a diene rubber substrate are disclosed in U.S. Pat. No. 3,509,237 which is incorporated herein by reference.

The graft copolymers defined as component (A) consist of 5 to 80% by weight, in particular 20 to 70% by weight, of rubber and 95 to 20% by weight, in particular 80 to 30% by weight, of grafted monomers. Such graft copolymers are prepared by known free-radical graft copolymerization of the abovementioned monomers in the presence of the rubbers to be grafted. Preferred grafting processes are graft polymerization in emulsion, solution, bulk or suspension.

The product of the grafting process contains the rubber grafted with the polymerized monomer as well as ungrafted polymerized monomers. The true content of the grafted rubber and simultaneously formed ungrafted polymerized monomers can be determined by known parameters such as degree of grafting or grafting yield. Such grafting yields can vary within wide ranges with the conditions of graft polymerization.

Examples of ethylenically unsaturated epoxide compounds suitable for use in component (B) of the invention, and which are known in principle, are glycidyl (meth)acrylate, allyl glycidyl ether and propenyl glycidyl ether, especially preferred is glycidyl methacrylate.

Preferred epoxide group containing polymers of component (B) are copolymers of styrene, acrylonitrile and glycidyl methacrylate; $\alpha$-methylstyrene, acrylonitrile and glycidyl (meth)acrylate; $\alpha$-methylstyrene, styrene, acrylonitrile and glycidyl methacrylate; styrene, methyl methacrylate and glycidyl methacrylate; styrene, acrylonitrile, methyl methacrylate and glycidyl methacrylate; styrene, maleic anhydride and glycidyl methacrylate; and styrene, acrylonitrile, maleic anhydride and glycidyl methacrylate; styrene, maleic anhydride, methyl methacrylate and glycidyl methacrylate.

Copolymers containing epoxide groups as defined under component (B) are prepared, for example, by known solution polymerization in organic hydrocarbons or emulsion or suspension polymerization systems. Examples of suitable solution polymerization conditions involve performing the polymerization in solvents selected from the group consisting of organic hydrocarbons which are inert to epoxide groups, such as, for example, toluene, ethylbenzene, xylene, high-boiling aliphatics, esters or ethers.

Copolymers containing epoxide groups which are as defined as one form of component (B) can be prepared by bulk polymerization, it being necessary to perform the polymerization with thermal or free-radical initiation at temperature of 40° C. to 150° C., in particular 80° to 130° C., especially as a continuous process and with partial monomer conversion, so that the resulting polymer is obtained as a solution in the monomer system.

Examples of suitable monomers for polymerization to form known epoxide-free thermoplastic polymers of component (B) which are mixed with the epoxide-containing polymer: are styrene, $\alpha$-methylstyrene, acrylonitrile, methyl methacrylate, a halogenated styrene, p-methylstyrene, maleic anhydride, N-substituted maleimides and small quantities of up to 10% by weight of monomers such as butyl acrylate, vinyl ether or vinyl acetate.

Preferred epoxide-free copolymers as defined under component (B) are styrene/acrylonitrile copolymers, $\alpha$-methylstyrene/acrylonitrile copolymers and styrene/maleic anhydride copolymer.

The molecular weights of the epoxide-free copolymers, $M_w$ (weight-average molecular weight), should be between 30,000 and 200,000, determined by light scattering or sedimentation.

Moulding compositions according to the invention contain epoxide-free thermoplastic copolymers containing maleic anhydride at a level in combination with epoxide-containing thermoplastic copolymers. Epoxide-free copolymers are prepared in known manner by polymerization in solution, bulk or emulsion. Component (B) can be a mixture of one or more copolymers which contain the copolymerized unsaturated dicarboxylic acid anhydride and ethylenically unsaturated epoxide compound, but the total quantity in the copolymer or mixture of copolymers of component (B) of (i) unsaturated dicarboxylic acid anhydride is 1 to 25% by weight and (ii) epoxide compound is 0.5 to 2.0% by weight.

The molding compositions of the invention can be prepared by melt compounding the individual components at temperatures of 200° to 280° C., preferably 230° to 250° C. in conventional equipment such as extruders and the like.

Optional components may be added to the compositions of the invention depending on the intended use and nature thereof, such as, for example, fillers, pigments and flame retardant additives. It may be necessary to incorporate stabilizers and antioxidants to prevent degradation of the rubber graft copolymers and even of the rubber-free polymer matrix components.

The following specific examples are intended to illustrate more fully the nature of the present invention without acting as a limitation on its scope. Percentages and parts given are on a weight basis.

EXAMPLES 1 AND 2—AND COMPARATIVE EXAMPLES C1, C2, AND C3

The following tests were conducted on specimens prepared according to the Examples:
1. Notched izod impact (J/m notch) ASTM D-256-70; sample bar cross section of 12.7 mm×3.2 mm.
2. Gloss—% specular reflectance using a Glossgard System 60 instrument from Gardner Instruments, Bethesda, MD; measured parallel to the direction of flow of the polymer into the mold cavity.
3. Particle size (microns): centrifugal photosedimentation.

Polymers and additives used were the following:

A1 Graft copolymer blend of two ABS rubber graft copolymers, the rubber phase particle size of one being larger than the other. The blend was prepared in accordance with Example 4 of U.S. Pat. No. 4,559,386, the content of which is incorporated herein by reference. The small particle size ABS rubber graft copolymer was prepared by grafting under emulsion polymerization conditions 43 parts of styrene and 18.5 parts of acrylonitrile onto 100 parts of a 93:7 butadiene/acrylonitrile copolymer latex previously prepared by emulsion polymerization and having a weight average particle size of about 0.211 micron. The large particle size ABS rubber graft copolymer was prepared by reacting under mass/suspension polymerization conditions 448 parts styrene and 192 parts acrylonitrile onto 100 parts of a butadiene rubber obtained as Diene 55 from Firestone Synthetic Rubber and Latex Company of Akron, Ohio and having a weight average particle size of about 2.0 micron. Seventeen percent of the charged monomers were grafted to the rubber, eighty three percent of such monomers forming styrene/acrylonitrile copolymer. The rubber content of such large mode graft copolymer was 13.5 wt. %. The two rubber graft copolymers were melt blended with additional styrene/acrylonitrile copolymer at a weight ratio of 79/21 small/large particle size components. The rubber content of the blend was 13.5% by weight and it contained 86.5% by weight total styrene/acrylonitrile copolymer. The SAN-rubber graft copolymer content of the blend was 33 weight % with the ungrafted copolymer content being 67%.

B1 Styrene/acrylonitrile copolymer at a polymerized styrene/acrylonitrile ratio of 67.5/22.5.

B2 Styrene/maleic anhydride/methyl methacrylate terpolymer at a weight ratio of 69:25:6.

B3 Styrene/maleic anhydride copolymer at a weight ratio of 93:7.

B4 Styrene/maleic anhydride copolymer at a weight ratio of 99/1.

B5 Styrene/acrylonitrile/glycidyl methacrylate. A styrene/acrylonitrile/glycidyl methacrylate terpolymer containing polymerized styrene//acrylonitrile/glycidyl methacrylate at a weight ratio of 68.25/30/1.75 was obtained by polymerizing at 145° C. a mixture of 1.4 parts by wt. glycidyl methacrylate, 53 parts by weight styrene, 25 parts by weight acrylonitrile, in 20 parts by weight methyl ethyl ketone using 0.105 parts by weight tertiary butyl ethoxy carbonate initiator and 0.2 parts by wt. isooctyl phthalate chain transfer agent until the solution had a solids content of 60%. The solvent was stripped off to give a terpolymer having the above-noted monomer ratios.

The test specimens used for the individual tests were formed by injection molding at 260° C. The machine used was Arburg, the processing conditions being as follows:

screw speed—90/rpm
injection pressure—1000 psi
mold temperature—44° C.
holding pressure—900 psi

| Composition | EXAMPLES | | COMPARATIVE EXAMPLES | | |
|---|---|---|---|---|---|
| (Parts) | 1 | 2 | C1 | C2 | C3 |
| ABS A1 | 46 | 46 | 46 | 46 | 46 |
| Polymer B1 | — | — | 50.25 | — | — |
| Polymer B2 | — | 50.25 | — | 52 | — |
| Polymer B3 | 50.25 | — | — | — | — |
| Polymer B4 | — | — | — | — | 50.25 |
| Polymer B5 | 1.75 | 1.75 | 1.75 | — | 1.75 |
| Lubricant* | 2 | 2 | 2 | 2 | 2 |
| Properties | | | | | |
| Gloss | 9 | 12 | 47 | 38 | 50 |
| Notched Impact | 70 | 65 | 180 | 168 | 155 |

*sorbitan tristearate

The foregoing property data shows the significant reduction in gloss obtained (Examples 1 and 2) when the composition includes a copolymer containing an epoxide-group containing constituent versus control Examples C1 and C2 respectively representing conventional commercial ABS and heat resistant maleic-anhydride-containing molding compositions. Control Example C3 shows that the low gloss effect is not obtained when the unsaturated dicarboxylic anhydride monomer content of the composition is too low—i.e. 0.4 wt. % of component (B).

While certain specific embodiments of the invention have been described with particularity herein, it will be recognized that various modifications thereof will occur to those skilled in the art. The scope of the invention, therefore, is to be limited solely by the scope of the following claims.

We claim:

1. A composition consisting essentially of:
   (A) 20–50% by weight of a graft copolymer of ethylenically unsaturated monomers grafted onto a rubber with a rubber content of 5 to 80% by weight based on the weight of component (A);
   (B) 80–50% by weight of thermoplastic rubber-free polymers consisting essentially of:
      (i) a copolymer comprising an ethylenically unsaturated aromatic monomer and an unsaturated nitrile;
      (ii) a polymer of styrene and maleic anhydride containing 1 to 25 % by weight based on the total weight of component (B) of polymerized maleic anhydride monomer; and
      (iii) 1 to 5% by weight based on the total weight of component (B) of a terpolymer comprising polymerized monomers of styrene, acrylonitrile and ethylenically unsaturated epoxide wherein the relative amounts by weight of the monomers in the terpolymer are 68 to 80% of styrene, 19.5 to 30% of acrylonitrile and 0.5 to 2% of ethylenically unsaturated epoxide,
   wherein the total of (A) and (B) must be 100% by weight.

2. The composition of claim 1 wherein Component (A) comprises a conjugated diene rubber substrate grafted with a copolymer of an ethylenically unsaturated aromatic monomer and an unsaturated nitrile monomer.

3. The composition of claim 2 wherein the ratio of ethylenically unsaturated aromatic monomer to unsaturated nitrile monomer in the graft is between about 80:20 to 60:40.

4. The composition of claim 1, 2, or 3 wherein the epoxide compound is glycidyl methacrylate.

* * * * *